US007032338B2

(12) United States Patent
Sloot

(10) Patent No.: US 7,032,338 B2
(45) Date of Patent: Apr. 25, 2006

(54) WHEEL ACCESSORY

(75) Inventor: Alexander Sloot, Sugarloaf, PA (US)

(73) Assignee: Printmark Industries, Inc., Hazleton, PA (US)

( * ) Notice: Subject to any disclaimer, the term of this patent is extended or adjusted under 35 U.S.C. 154(b) by 318 days.

(21) Appl. No.: 10/103,346

(22) Filed: Mar. 21, 2002

(65) Prior Publication Data

US 2003/0177678 A1 Sep. 25, 2003

(51) Int. Cl.
*G02B 5/134* (2006.01)
*G02B 5/12* (2006.01)
*G09F 21/04* (2006.01)

(52) U.S. Cl. .................... 40/587; 301/37.41; D11/111; 359/523

(58) Field of Classification Search .................. 40/587, 40/665, 633; 301/37.41; D11/111; 359/523
See application file for complete search history.

(56) References Cited

U.S. PATENT DOCUMENTS

| | | | | | |
|---|---|---|---|---|---|
| 627,920 | A | * | 6/1899 | Gould | 40/6 |
| D233,422 | S | * | 10/1974 | Amoroso | D10/111 |
| 4,470,663 | A | * | 9/1984 | Tresch et al. | 301/37.41 |
| 4,612,935 | A | * | 9/1986 | Greifer | 2/268 |
| 4,837,959 | A | * | 6/1989 | Celico | 40/584 |
| 5,923,483 | A | | 7/1999 | Sloot | |
| 6,016,101 | A | | 1/2000 | Brown | |
| 6,273,572 | B1 | | 8/2001 | Rood | |

FOREIGN PATENT DOCUMENTS

FR 2430346 * 7/1978

* cited by examiner

*Primary Examiner*—Cassandra Davis
(74) *Attorney, Agent, or Firm*—St. Onge Steward Johnston & Reens LLC

(57) ABSTRACT

An accessory for wheels includes a body, two appendages extending from the body, each of the two appendages having a securing mechanism and an aperture, and each of the two appendages being wrapped around a diameter of a spoke and the securing mechanism being placed in the aperture, thereby securing each of the two appendages about the spoke.

20 Claims, 3 Drawing Sheets

WHEEL ACCESSORY

FIELD OF THE INVENTION

The invention relates to an accessory attachable to any wheel having spokes and, more particularly, to an accessory having a body with appendages for securing the accessory to the spokes.

BACKGROUND OF THE INVENTION

Wheel attachments are known in the prior art to provide several benefits to both users of the wheel attachments and operators of motor vehicles who are in visual contact with the users. Wheel attachments, such as reflectors, often reflect a motor vehicle's light and, as a result, make the user more visible to motor vehicle drivers. Moreover, this feature typically provides safety benefits to the users.

Reflectors are often used on bicycles but may also be used on motorcycles, wheelchairs, and other vehicles desired to have enhanced visibility. One problem often associated with wheel mounted reflectors is difficulty mounting the reflectors to the spokes of the wheel. Some reflectors are fastened to spokes via fasteners such as screws, nuts, bolts, and the like. Fasteners that come loose during normal riding conditions over time may result in the reflectors coming off and becoming lost. Other reflectors snap onto the spokes, making removal difficult and often resulting in damage to the reflectors and/or bending of the spokes.

U.S. Pat. No. 5,923,483 to Sloot ("Sloot") relates to a wheel spoke reflector typically having holes that accept and hold a wheel spoke. The holes generally secure the reflector to the spoke but may permit the reflector to freely slide up and down and rotate about the spoke. U.S. Pat. No. 6,016,101 to Brown ("Brown") relates to an illuminated bicycle reflector typically having an arc shaped outer portion and an arc shaped inner portion. The outer and inner portions are generally fastened to each other on either side of the wheel spokes via screws, thereby securing the reflector to the spokes. U.S. Patent to Burison (Burison") generally relates to a bicycle reflector having several reflective members. The reflective members may be attached to spokes of the wheel via bolts, nuts, and washers. Also, attaching reflective members using fasteners, such as bolts, nuts, and washers, can be relatively expensive and complex to operate when compared to other securing mechanisms.

Neither Sloot, Brown, nor Burison discloses a wheel accessory that is easily attached to and removed from a wheel. No reference discloses a wheel accessory that reduces damage to the wheel accessory and/or wheel upon installation or removal. Further, no reference discloses a wheel accessory that, in addition to being easily attached to and removed from a wheel, is adequately secured to the wheel. Additionally, neither of these references disclose a securing mechanism for attaching the wheel accessory to the wheel that is simple and inexpensive to use.

What is desired, therefore, is a wheel accessory having a simple and inexpensive mechanism for securely attaching the wheel accessory to the spokes of a wheel. Another desire is to have an accessory with indicia on at least one side of the accessory for advertising purposes. It is another desire to have an accessory with reflective characteristics on at least one side of the accessory for safety purposes.

SUMMARY OF THE INVENTION

Accordingly, it is an object of the invention to provide a wheel accessory having a simple and inexpensive mechanism for securely attaching the wheel accessory to the spokes of a wheel.

It is another object of the invention to provide an accessory that is easily attached to and removed from the spokes.

These and other objects of the invention are achieved by providing an accessory for wheels, including a body, two appendages extending from the body, each of the two appendages having a securing mechanism and an aperture, and each of the two appendages being wrapped around a diameter of a spoke and the securing mechanism being placed in the aperture, thereby securing each of the two appendages about the spoke.

The accessory may further include a second, or multiple, apertures for receiving the securing mechanism, thereby permitting adjustment of a perimeter of each of the two appendages being wrapped around the diameter of the spoke.

The accessory may further include indicia on at least one side of the body, the indicia being selected from the group consisting of a logo, advertising indicia, a trademark, and combinations thereof. The accessory may also include a reflective element on at least one side of the body. Further, the accessory may also include a section removably attached to the body, the section having information thereon.

In another embodiment, the securing mechanism is a stud protruding generally perpendicularly from each of the two appendages. The appendage is secured to the spoke by placing a portion of the stud in the aperture. The stud may further include a mushroom shaped end being placed through the aperture, thereby inhibiting the stud from separating from the aperture.

In another embodiment, the securing mechanism is a free end having at least one indentation. The appendage is secured to the spoke by placing the free end in the aperture. The appendage is further secured to the spoke by placing the free end in the aperture until the at least one indentation is engaged with the aperture, thereby inhibiting the free end from separating from the aperture. The free end may further include a tapered geometry for facilitating placement of the free end in the aperture.

The invention and its particular features and advantages will become more apparent from the following detailed description considered with reference to the accompanying drawings.

DETAILED DESCRIPTION OF THE DRAWINGS

Figure 1:
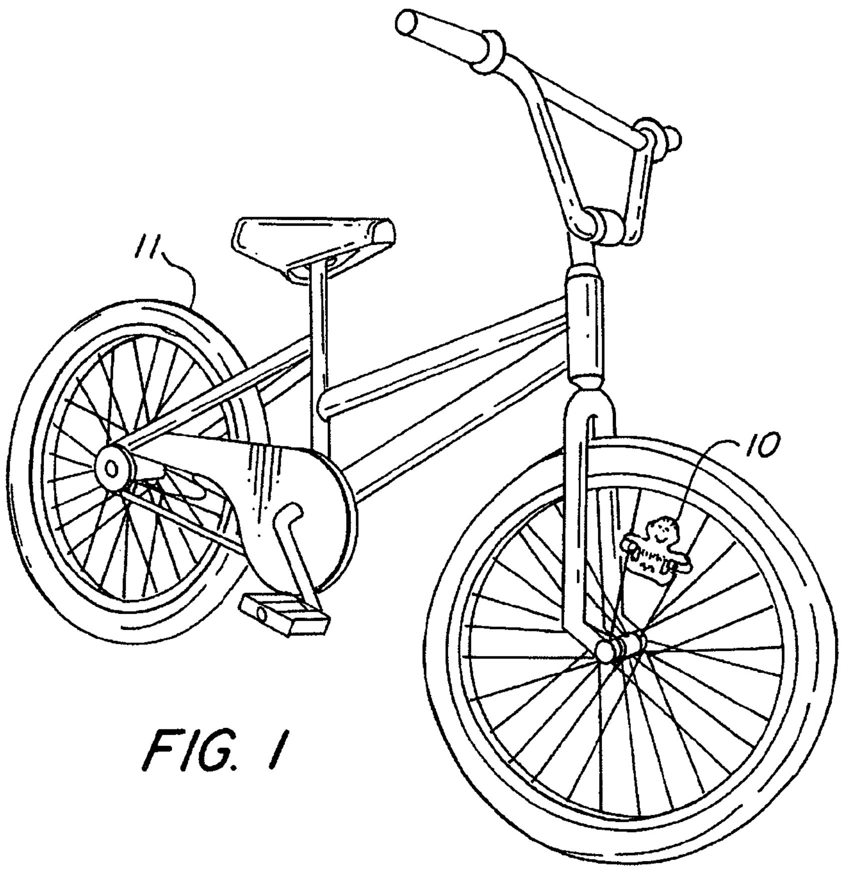
FIG. 1 depicts the wheel accessory installed on a bicycle wheel.
Figure 2:
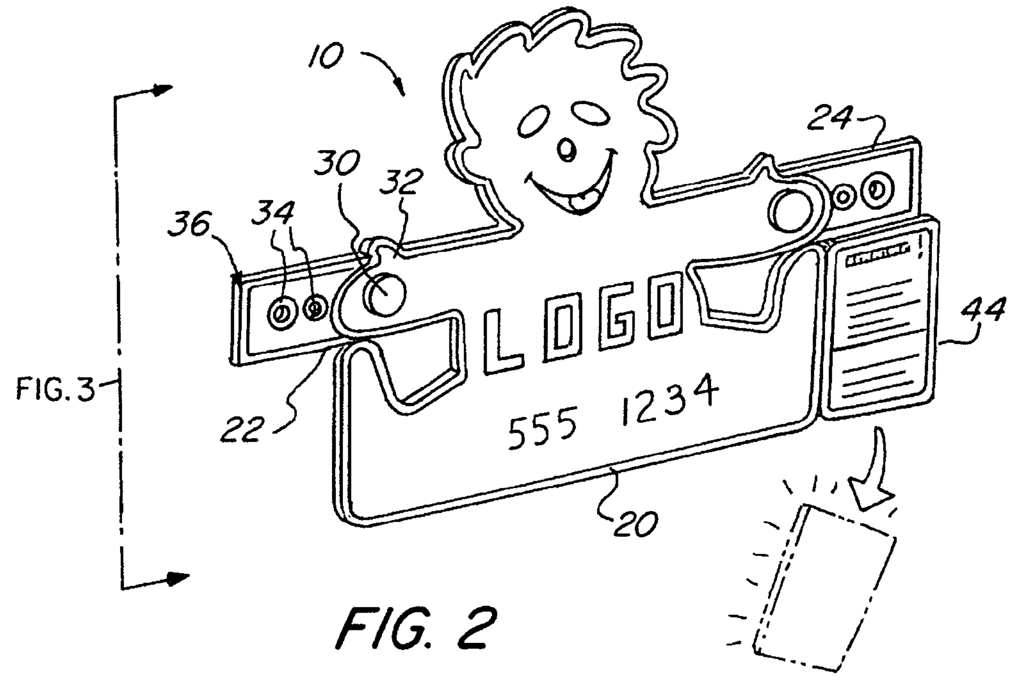
FIG. 2 depicts the wheel accessory in accordance with the invention.

FIG. 1 depicts the wheel accessory 10 installed on bicycle 11. As shown, accessory 10 is placed between two adjacent spokes of a bicycle wheel. However, accessory 10 may also be placed between two non-adjacent spokes where accessory 10 extends over one or more spokes. FIG. 2 depicts a close up view of accessory 10 in accordance with the invention. Accessory 10 is wheel attachment used to adorn a wheel by attaching to the spokes. Accessory 10 may have reflective properties to reflect the light of oncoming vehicles so that the accessory's user's visibility is enhanced. Accessory 10 may also have indicia written on at least one side of accessory 10 so that information, such as advertising information, may be conveyed to a reader.

Accessory 10 comprises body 20, left appendage 22, and right appendage 24. In certain embodiments, body 20 includes reflective properties for reflecting the light of oncoming vehicles. In other embodiments, body 20 includes indicia, such as a logo, trademark, advertisement, or some combination of the above. The indicia may be for the purposes of advertising a name, product, or contact information. In further embodiments, body 20 includes both reflective properties and indicia. Appendages 22 and 24 may also include reflective properties, indicia, or both. However, appendages' 22 and 24 primary purpose is to act as a securing mechanism to secure body 20 to spokes of a wheel.

It should be understood that, although two appendages are shown, more that two appendages may be utilized. All that is required is for there to be at least two appendages. For example, there may be two, three, or more on each side of body 20 for securing body 20 to bicycle 11.

Figure 3:
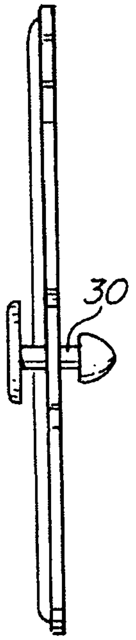
FIG. 3 depicts a side view of the wheel accessory.

Both left appendage 22 and right appendage 24 have the same characteristics and limitations. Therefore, for the sake of simplicity, the description will focus on left appendage 22. Left appendage 22 is an extension extending generally horizontally from body 20 and further includes a stud 30 (see FIG. 3) protruding generally perpendicularly from an end 32 of said left appendage 22. Left appendage also includes aperture 34 at a free end 36 of appendage 22.

Figure 4:
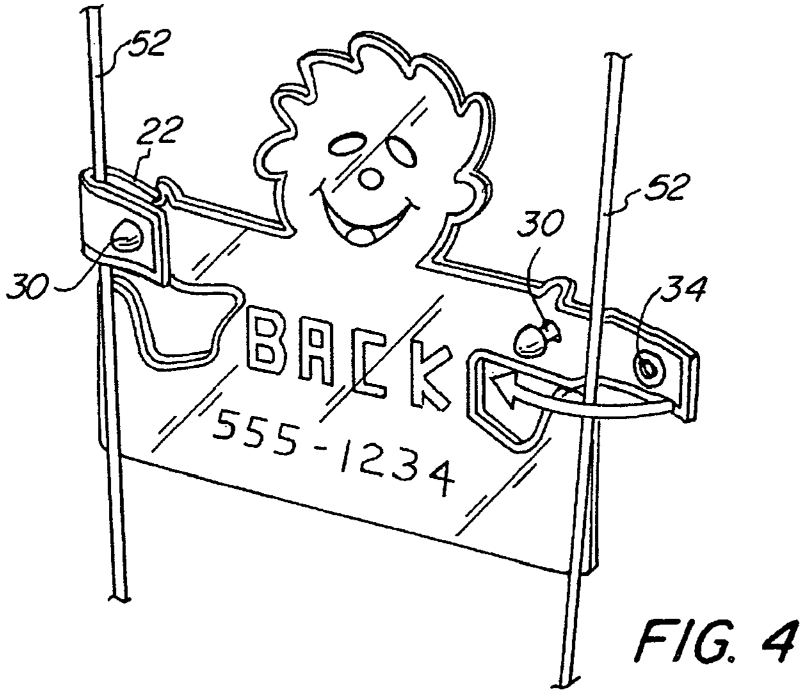
FIG. 4 depicts a close up view of the wheel accessory as it is being installed on the spokes of a wheel.

As shown in FIG. 4, to secure body 20 to spoke 52, left appendage 22 is wrapped around spoke 52 and stud 30 is placed through aperture 34. Stud 30 need not be inserted completely through aperture 34 to secure body 20 to spoke 52. Stud 30 need only be inserted through aperture 34 to the point where stud 30 is sufficiently held within aperture 34 and, therefore, body 20 is secured to spoke 52. To further enhance securing body 20 to spoke 52, stud may further include a mushroom-shaped head (see FIG. 3) that, when inserted through aperture, inhibits stud 30 from separating from aperture 34. To accommodate spokes 52 of varying diameters or distances between spokes 52 of varying dimensions, left appendage 22 may further include a plurality of apertures 34. Therefore, stud 30 may be inserted through any one of the plurality of apertures to vary the perimeter of the left appendage 22 being wrapped around spoke 52. Additionally, stud 30 is not necessarily integrally formed with end 32 but may be a separable piece that is passed through end 32 and aperture 34.

It should be understood that stud 30 is not limited to be located on end 32 but may be located on free end 36 and aperture 34 or plurality of apertures 34 may be located on end 32.

Preferably, body 20 and left appendage 22 are made of a soft material such that left appendage 22 may be wrapped around a spoke. A soft material further results in less damage to accessory 10 if accessory 10 came loose from the wheel. In other embodiments, body is made of a rigid material but left appendage 22 is still made of a soft material.

Figure 5:
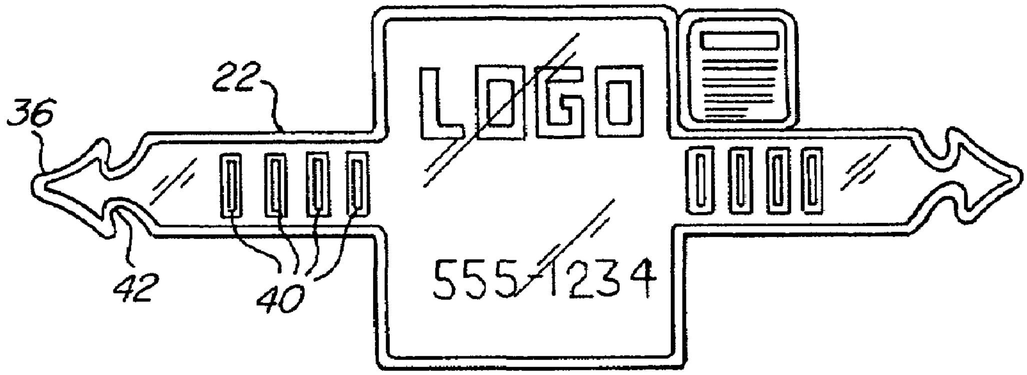
FIG. 5 depicts another embodiment of the invention where the appendages include a notched free end instead of a mushroom-shaped stud for placement within the aperture.
Figure 6:
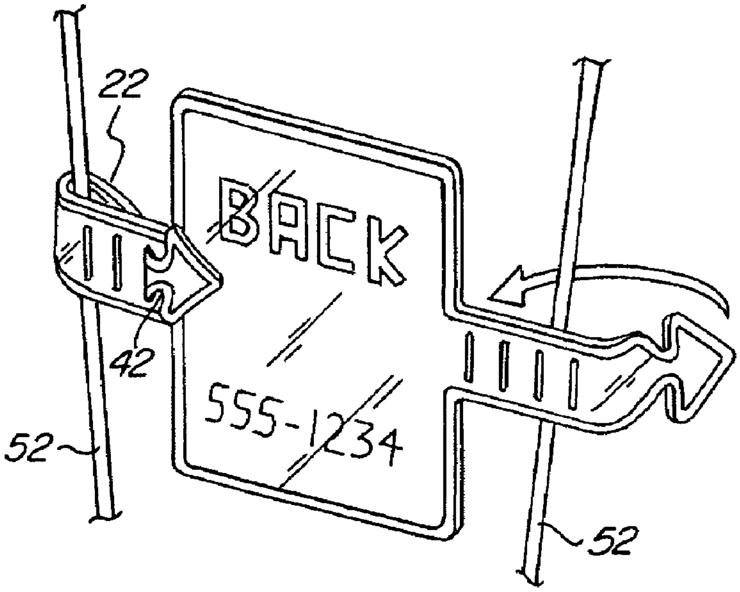
FIG. 6 depicts a close up view of the wheel accessory as it is being installed on the spokes of the wheel.

FIG. 5 depicts another embodiment of the invention where left appendage 22 includes slit 40 located at end 32 and free end 36 includes an indentation 42, or notch or groove. To secure body 20 to spoke 52 (see FIG. 6), left appendage 22 is wrapped around spoke 52 and free end 36 is inserted into slit 40 to the point where indentation 42 engages slit 40. This engagement inhibits free end 36 from separating from slit 40. To provide adjustment to the perimeter of left appendage 22 being wrapped around spoke 52, end 32 may further include a plurality of slits 40, where free end 36 is insertable in any one of the plurality of slits 40. As shown, free end 36 may also have a tapered geometry for facilitating placement of free end 36 in slit 40.

Optionally, accessory 10 may further include section 44 (see FIG. 2), which is removable and separable from body 20 and appendages 22 and 24. Section 44 may include installation instructions or serve other temporal benefits that, once realized, reduces the value of having section 44 attached to body 20 or appendages 22 and 24. Therefore, section 44 is removable and separable so that section 44 may be discarded.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An accessory for wheels, comprising:

a body;

at least two appendages extending from said body;

each of said two appendages having a securing mechanism and at least two apertures;

each of said two appendages being wrapped around a diameter of a spoke and said securing mechanism being placed in said aperture, thereby securing each of said two appendages about the spoke; and wherein each securing mechanism is passed twice through each respective appendage and passed through at least two of said at least two respective apertures.

2. The accessory according to claim 1, wherein said securing mechanism is a stud protruding generally perpendicularly from each of said two appendages.

3. The accessory according to claim 2, wherein said stud is integrally formed with each of said two appendages.

4. The accessory according to claim 1, each of said two appendages further comprising a second aperture for receiving said securing mechanism, thereby permitting adjustment of a perimeter of each of said two appendages being wrapped around the diameter of the spoke.

5. The accessory according to claim 1, wherein said body further comprises indicia on at least one side, said indicia selected from the group consisting of a logo, advertising indicia, a trademark, and combinations thereof.

6. The accessory according to claim 1, wherein said body comprises a reflective element on at least one side.

7. An accessory for wheels, comprising:

a body;

at least one appendage extending from said body;

said at least one appendage having a stud protruding generally perpendicularly from said at least one appendage;

said at least one appendage having an aperture;

said at least one appendage being wrapped around a diameter of a spoke and a portion of said stud being placed in said aperture, thereby securing said at least one appendage about the spoke; and a section removably attached to said body, said section having information thereon.

8. The accessory according to claim 7, wherein said at least one appendage comprises two appendages, and wherein said body is held between two spokes by said two appendages.

9. The accessory according to claim 7, said at least one appendage further comprising a second aperture for receiving said portion of said stud, thereby permitting adjustment of a perimeter of said at least one appendage being wrapped around the diameter of the spoke.

10. The accessory according to claim 7, wherein said stud further comprises a mushroom shaped end being placed through said aperture, thereby inhibiting said stud from separating from said aperture.

11. The accessory according to claim 7, wherein said body further comprises indicia on at least one side, said indicia selected from the group consisting of a logo, advertising indicia, a trademark, and combinations thereof.

12. The accessory according to claim 7, wherein said body comprises a reflective element on at least one side.

13. An accessory for wheels, comprising:

a body;

at least two appendages extending from said body;

each of said two appendages having a securing mechanism and an aperture;

each of said two appendages being wrapped around a diameter of a spoke and said securing mechanism being placed in said aperture, thereby securing each of said two appendages about the spoke; and a section removably attached to said body, said section having information thereon.

14. The accessory according to claim 13, wherein said securing mechanism is a stud protruding generally perpendicularly from each of said two appendages.

15. The accessory according to claim 14, wherein said stud is integrally formed with each of said two appendages.

16. The accessory according to claim 13, wherein said securing mechanism is passed through both each of said two appendages and said aperture.

17. The accessory according to claim 13, wherein said securing mechanism is a free end, said free end having at least one indentation.

18. The accessory according to claim 13, each of said two appendages further comprising a second aperture for receiving said securing mechanism, thereby permitting adjustment of a perimeter of each of said two appendages being wrapped around the diameter of the spoke.

19. The accessory according to claim 13, wherein said body further comprises indicia on at least one side, said indicia selected from the group consisting of a logo, advertising indicia, a trademark, and combinations thereof.

20. The accessory according to claim 13, wherein said body comprises a reflective element on at least one side.

* * * * *